US008855866B2

(12) United States Patent
Bolton

(10) Patent No.: US 8,855,866 B2
(45) Date of Patent: Oct. 7, 2014

(54) REAR END ADVANCED COLLISION TECHNOLOGY

(75) Inventor: Zachary Joseph Bolton, Birmingham, MI (US)

(73) Assignee: Continental Automotive Systems, Inc., Auburn Hills, MI (US)

(*) Notice: Subject to any disclaimer, the term of this patent is extended or adjusted under 35 U.S.C. 154(b) by 393 days.

(21) Appl. No.: 13/302,521

(22) Filed: Nov. 22, 2011

(65) Prior Publication Data
US 2013/0131928 A1    May 23, 2013

(51) Int. Cl.
B60R 22/00     (2006.01)
G05D 1/00      (2006.01)
G06F 17/10     (2006.01)
B60R 21/0134   (2006.01)

(52) U.S. Cl.
CPC ................................ B60R 21/0134 (2013.01)
USPC .................................. 701/45; 701/1; 701/301

(58) Field of Classification Search
None
See application file for complete search history.

(56) References Cited

U.S. PATENT DOCUMENTS

| | | | |
|---|---|---|---|
| 6,720,920 B2* | 4/2004 | Breed et al. | 342/386 |
| 6,725,140 B2* | 4/2004 | Lu et al. | 701/45 |
| 6,906,621 B2* | 6/2005 | Kore | 340/436 |
| 7,495,550 B2 | 2/2009 | Huang et al. | |
| 7,676,307 B2* | 3/2010 | Schmitt et al. | 701/38 |
| 8,577,550 B2* | 11/2013 | Lu et al. | 701/41 |
| 8,712,639 B2* | 4/2014 | Lu et al. | 701/38 |
| 2002/0105416 A1* | 8/2002 | Kore | 340/425.5 |
| 2002/0198632 A1* | 12/2002 | Breed et al. | 701/1 |
| 2003/0212482 A1* | 11/2003 | Lu et al. | 701/45 |
| 2005/0033486 A1* | 2/2005 | Schmitt et al. | 701/1 |
| 2006/0125315 A1* | 6/2006 | Hool | 303/116.2 |
| 2008/0046145 A1* | 2/2008 | Weaver et al. | 701/41 |
| 2011/0082623 A1* | 4/2011 | Lu et al. | 701/41 |
| 2011/0264347 A1 | 10/2011 | Cetinkaya | |
| 2012/0268260 A1* | 10/2012 | Miller et al. | 340/435 |
| 2013/0229289 A1* | 9/2013 | Bensoussan et al. | 340/902 |

FOREIGN PATENT DOCUMENTS

| | | |
|---|---|---|
| DE | 102004062497 A1 | 7/2006 |
| DE | 602004001059 T2 | 11/2006 |
| DE | 102005052250 A1 | 5/2007 |
| DE | 102006054092 B3 | 4/2008 |
| DE | 102008040038 A1 | 6/2009 |
| DE | 102008042963 A1 | 2/2010 |
| EP | 1445155 B1 | 7/2006 |

* cited by examiner

Primary Examiner — Mussa A Shaawat

(57) ABSTRACT

A method of controlling stability of a vehicle comprises monitoring vehicle information with an electronic control unit. The electronic control unit determines if a rear collision from a second vehicle approaching from a rear direction is likely. A first response signal is sent to at least one vehicle system from the electronic control unit prior to the rear collision. The at least one vehicle system changes state based upon the first response signal to prepare the vehicle for the rear collision.

14 Claims, 3 Drawing Sheets

REAR END ADVANCED COLLISION TECHNOLOGY

TECHNICAL FIELD

The present disclosure relates to automotive vehicles, and more particularly to safety systems for automotive vehicles.

BACKGROUND

An automotive vehicle may include a forward collision alert system to warn the vehicle operator and prepare the vehicle for a collision. The forward collision alert systems utilize sensors and cameras to detect obstacles in the vehicle path and warn the vehicle operator of a pending collision. By alerting the vehicle operator of an upcoming obstacle the vehicle operator may take action to avoid the obstacle.

Collision alert systems may further initiate vehicle actions to mitigate the effects or avoid a collision, such as pre-charging of the brakes. The collision warning systems may even take autonomous action to mitigate and/or avoid the collision, such as application of the vehicle brakes.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A method of controlling stability of a vehicle comprises monitoring vehicle information with an electronic control unit. The electronic control unit determines if a rear collision from a second vehicle approaching from a rear direction is likely. A first response signal is sent to at least one vehicle system from the electronic control unit prior to the rear collision. The at least one vehicle system changes state based upon the first response signal to prepare the vehicle for the rear collision.

Another method of controlling stability of a vehicle comprises monitoring vehicle information with an electronic control unit. The electronic control unit determines if a rear collision from a second vehicle approaching from a rear direction is likely. At least a first safety signal and a first response signal are sent to at least one vehicle system from the electronic control unit prior to the rear collision.

Further areas of applicability of the present disclosure will become apparent from the detailed description provided hereinafter. It should be understood that the detailed description and specific examples, while indicating the preferred embodiment of the disclosure, are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
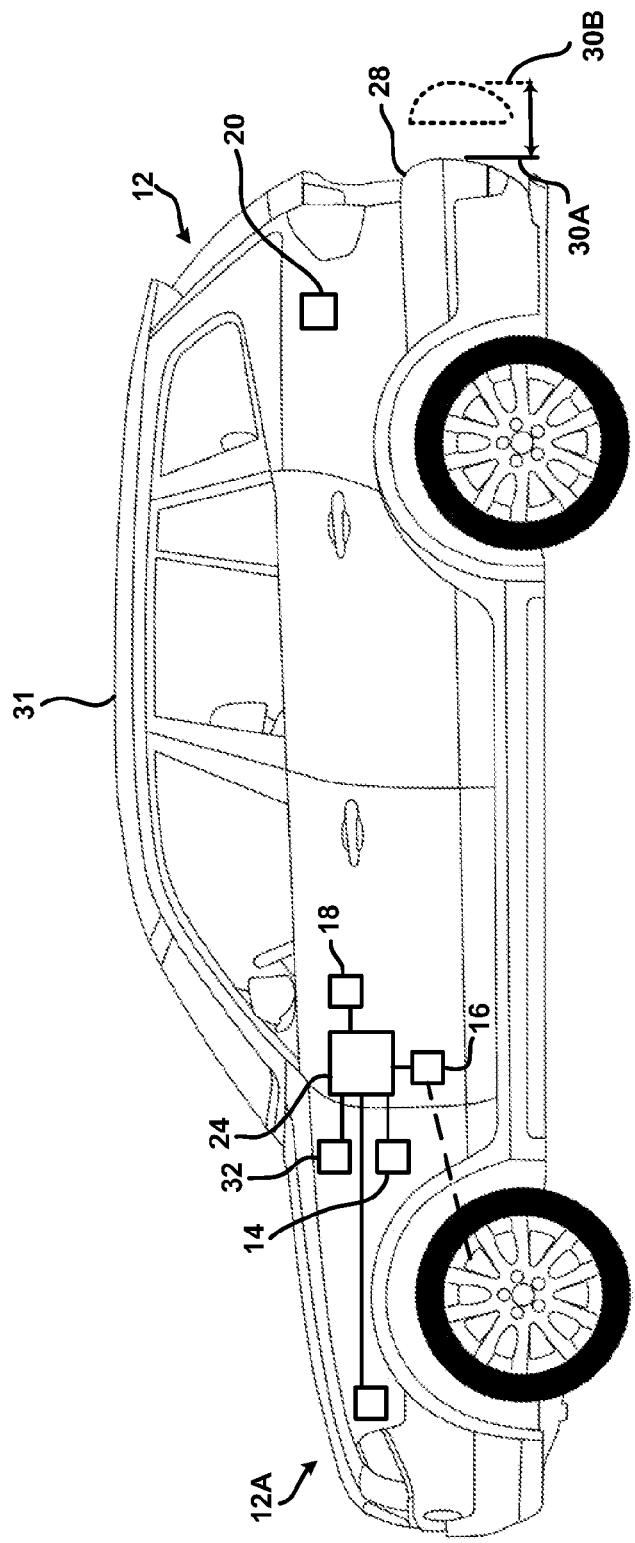
FIG. 1 is a schematic side view of a vehicle having a rear end advanced collision technology system of the present invention.

The following description is merely exemplary in nature and is in no way intended to limit the disclosure, its application, or uses. For purposes of clarity, the same reference numbers will be used in the drawings to identify similar elements. FIG. 1 is a schematic illustration of a vehicle 10 having a rear end advanced collision technology (REACT) system 12. The REACT system 12 preferably incorporates other existing vehicle 10 systems such as a forward collision alert (FCA) system 12A or a back-up assist system for the vehicle 10 and may be utilize the same components, as described below. Throughout the applications the relative directions of forward and rear are in reference to the direction which an operator for the vehicle 10 would be facing when operating the vehicle.

The REACT system 12 may be connected to other systems for the vehicle 10 including the FCA system 12A, a supplement restraint system 14, a brake system 16, and a steering system 18. Other systems, not shown, that provide information that may be utilized by the REACT system 12 may also be connected. Likewise, other systems, not shown, that may be used to control the vehicle 10 may also be connected to receive signals from the REACT system 12.

The REACT system 12 includes at least one of a rear facing sensor 20. The rear facing sensor 20 may be any of a proximity, lidar, camera, etc. Various other sensors including forward facing sensors may also be connected to the REACT system 12.

The REACT system 12 includes a module having an electronic control unit (ECU) 24. The ECU 24 receives input from the various vehicle systems and sensors mentioned above. As mentioned above, the rear facing sensor 20 and other sensors providing input data to the ECU 24 may also be part of already existing systems in the vehicle 10. The ECU monitors the vehicle 10 information which may include monitoring a GPS system, weather sensors, wheel speed sensors, a speedometer, a accelerometer, a steering sensor and a brake sensor. One skilled in the art would be able to determine which other sensors and systems may provide useful information to the REACT system 12.

Figure 2:
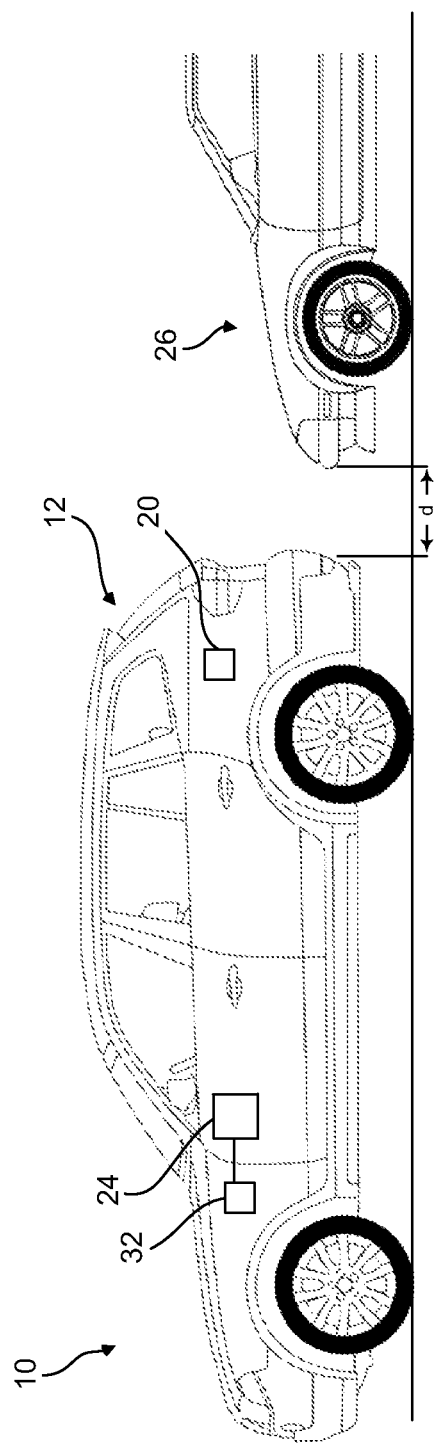
FIG. 2 is a schematic side view of the vehicle having the rear end advanced collision technology system of the present invention and a second vehicle.

FIG. 2 illustrates the first vehicle 10 having the REACT system 12 and a second vehicle 26. The rear-facing proximity sensor 20 detects an approaching obstacle, in this instance the second vehicle 26. To distinguish between approaching obstacles likely to result in a rear-end collision and overtaking vehicles while traveling at speed the REACT system 12 may be activated under pre-selected conditions, such as when the first vehicle 10 is at a stop, when the first vehicle 10 below a pre-determined speed, or when the difference in speed between the first vehicle 10 and the second vehicle 26 is above a predetermined threshold, where the threshold is a function of the speed of the first vehicle 10.

Based upon the data input from the rear-facing proximity sensors 20 and the other various systems and sensors mentioned above the ECU 24 calculates an approximate stopping distance for the second vehicle 26. If the stopping distance of the second vehicle 26 is greater than the clearance distance "d" between the first vehicle 10 and the second vehicle 26 the REACT system 12 alerts the operator of the first vehicle 10 of the possibility of a pending collision. The evaluation of the stopping distance and the clearance distance "d" may factor in the stopping distance of the first vehicle 10 and the relative speed between the first vehicle 10 and the second vehicle 26, such as when the first vehicle 10 is braking and not at a complete stop.

The REACT system 12 may use the kinematic data to compute the potential rear end collision and send one or more safety and response signals to the various vehicle 10 systems to initiate an action that will mitigate and/or prevent the pending collision. These actions may include, sounding a horn, flashing a rear facing light, pre-tensioning the seat belts, adjusting the seat position, pre-charging the brakes, deploying a rear facing bumper to an extended collision position, lowering a body height of the vehicle 10, and rolling the vehicle 10 forward as space allows to increase the stopping distance available to the second vehicle 26.

Referring to FIGS. 1 and 2, as discussed above, the vehicle 10 may have an energy reducing bumper 28. The bumper 28 may be moveable between a normal position 30A and an extended position 30B. In the extended position 30B the bumper may be in a location that provides enhanced energy absorption for a rear end collision to the first vehicle 10. The extended position 30B may move the bumper 28 laterally away from a body 31 of the vehicle 10 and may also lower the height or angle the bumper 28 to provide an enhanced position for absorbing energy from the second vehicle 26. Pyrotechnics or other deployment devices may be utilized to quickly move the bumper 28 between the normal position 30A and the extended position 30B. Additionally, a ride height for a rear axle of the first vehicle 10 may be adjusted to place the body of the first vehicle 10 in an enhanced position for absorbing energy from the second vehicle 26. One skilled in the art would be able to determined the preferred extended position 30B for a particular vehicle 10 to provide enhanced energy absorption in the event of a collision.

In one embodiment, the first vehicle 10 may be equipped with a first telematics unit 32. Therefore, the one or more signals sent from the ECU 24 for the REACT system 12 may also include a signal to the first telematics unit 32 to send an alert. In this instance, if the second vehicle 26 has a second telematics unit the signal may be received to issue an alert to the operator of the second vehicle 26, or to initiate forward collision alert system in the second vehicle 26 if available. If the second vehicle 26 has the second telematics unit available additional data from the second vehicle 26 sensors may also be utilized to compute the likelihood and predicted severity of a possible collision.

The REACT system 12 may also cooperate with the FCA system 12A to allow the vehicle 10 to move forward as space allows to increase the stopping distance available to the second vehicle 26. The FCA system 12A would provide information regarding the availability of space to move the vehicle 10 forward without encountering other obstacles. This embodiment may be particularly useful in situations where the first vehicle 10 is at a complete stop and a distance is available to another vehicle, which is also at a stop in front of the first vehicle 10. The FCA system 12A and the REACT system 12 may cooperate to allow the vehicle 10 to roll forward within the distance available while still maintaining clearance with any forward objects, thus, increasing the stopping distance for the second vehicle 26 behind the first vehicle 10. The FCA system 12A may utilize the same ECU 24 as the REACT system 12 to quickly and efficiently process data and to prevent and/or mitigate possible collisions for the first vehicle 10.

Figure 3:
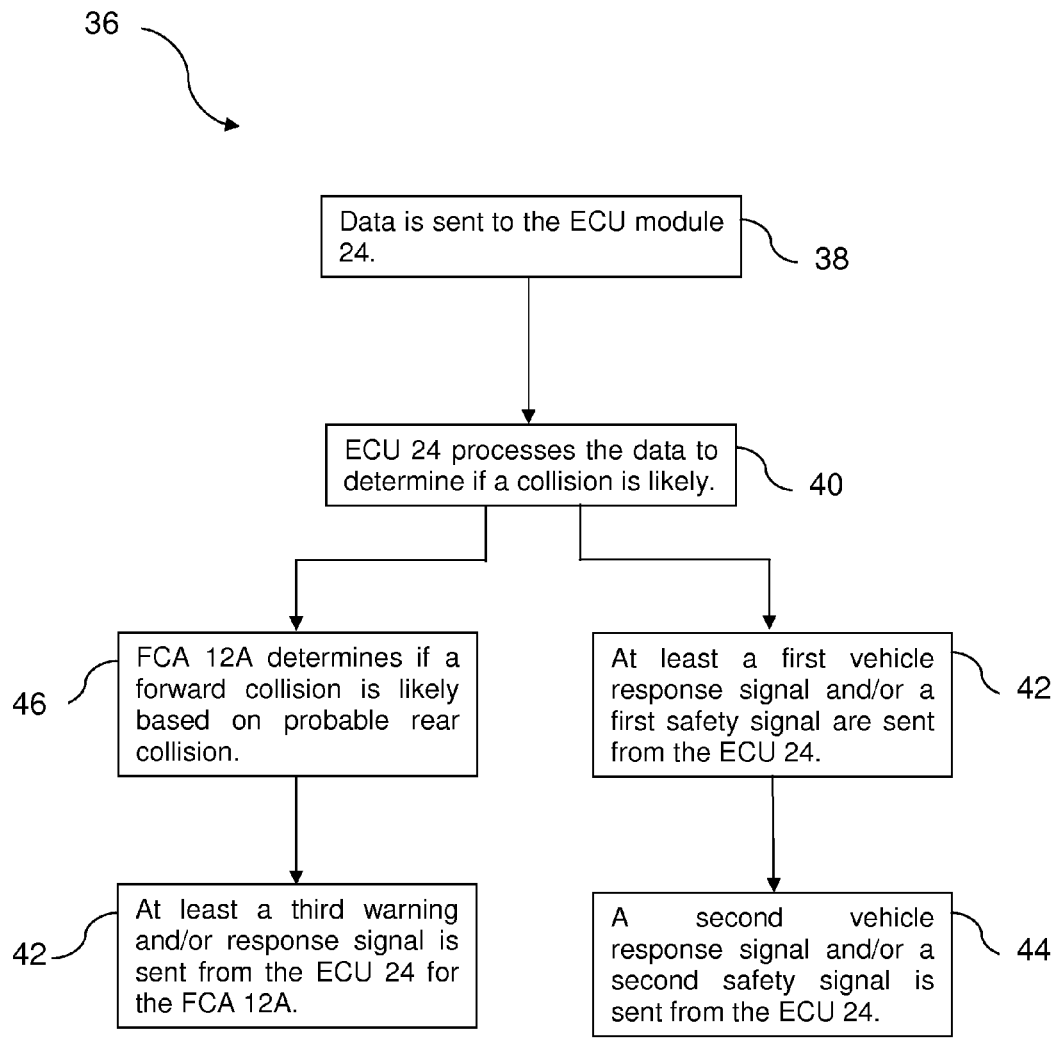
FIG. 3 is a schematic diagram of an exemplary implementation of the rear end advanced collision technology system for the vehicle of FIG. 1.

FIG. 3 illustrates a method 36 for operating the REACT system 12. With reference to FIGS. 1 and 2, the method 36 for operating the REACT system 12 is described below. Data is sent from various systems and sensors for the vehicle 10 to the ECU module 24, step 38. The ECU 24 monitors and processes the various data to determine if a collision is likely to occur, step 40. The rear facing sensor 20 and speedometer information is utilized to determine the stopping distance and clearance distance "d" for the second vehicle 26. The ECU 24 may also determine a predicted severity of a possible rear-end collision.

At least a first safety signal and a first vehicle response signal are sent from the ECU 24, step 42. The first safety signal initiates at least one warning or device to prepare and protect the occupants of the vehicle 10 and the first vehicle response signal initiates at least one response to proactively prepare the vehicle 10 from a possible collision.

In the embodiment shown, the first safety signal is intended to be a driver warning signal to the driver of the first vehicle to indicate that a rear collision is likely to occur shortly and/or to pre-activate a safety device to protect the passengers of the first vehicle 10. The driver warning signal may be an auditory signal, a visual signal, such as activating a warning lamp, a haptic signal, such as a steering wheel vibration, or a combination of these signals. The driver warning signal may be provided to the vehicle operator with sufficient time to allow the driver to preemptively adjust the operation of the vehicle 10 in order to avoid the rear collision, such as by braking or steering the car toward another area.

The safety device may be one of a seat belt restraint system, an airbag deployment system, a head restraint system, or other system designed to protect an occupant within passenger compartment. Pre-activating the safety device with the first safety signal would therefore include, pre-tensioning seat belts, pre-charging an airbag restraint, and pre-charging a head support system.

In addition the REACT system 12 also sends a first response signal to at least one vehicle 10 system to prepare the vehicle 10 for a rear collision. The first response signal may include, pre-charging the brakes, deploying a rear facing bumper to an extended collision position, lowering a body height of the vehicle 10, and rolling the vehicle 10 forward as space allows to increase the stopping distance available to the second vehicle 26. If the ECU 24 for the REACT system 12 detects that further action is required a second safety and/or a second response signal may also be sent, step 44.

The first response signal initiates at least one response that changes the state of the vehicle to prepare the vehicle 10 for or avoid a possible collision and has the primary purpose to reduce or eliminate damage to the vehicle 10. However, ideally the first response signal also acts to protect the passengers of the vehicle 10 as well. Whereas the first safety signal has the primary purpose to warn and protect the passengers and ideally also acts to protect the vehicle 10 as well.

While the REACT system 12 prepares the vehicle 10 for a detected possible collision the ECU 24 for the FCA system 12A also processes sensor data to determine if the vehicle 10 is likely to contact another object as a result of the rear collision, step 46. The ECU 24 for the FCA system 12A may send a third FCA response signal to prepare the vehicle for an impact from a forward direction.

While the best modes for carrying out the invention have been described in detail the true scope of the disclosure should not be so limited, since those familiar with the art to which this invention relates will recognize various alternative designs and embodiments for practicing the invention within the scope of the appended claims.

What is claimed is:

1. A method of controlling stability of a vehicle comprising:

monitoring vehicle information with an electronic control unit;

determining a rear collision from a second vehicle approaching from a rear direction is likely;

sending a first response signal to at least one vehicle system from the electronic control unit prior to the rear collision, wherein the at least one vehicle system changes state based upon the first response signal to prepare the vehicle for the rear collision;

determining a probability of collision following the at least one vehicle system changing state;

determining a clearance distance which the vehicle may be moved forward without and not contact a preceding object; and sending a signal to the brake system to release the brakes such that the vehicle may roll forward the determined clearance distance and applying the brakes to stop the vehicle at the clearance distance when the probability of collisions is that the rear collision is still likely.

2. The method of claim 1, further comprising sending at least a first safety signal, wherein sending the first safety signal includes sending at least one of a warning signal to prepare an occupant of the vehicle, a warning signal to prepare an occupant of the second vehicle, and a signal to activate safety device to protect an occupant of the vehicle.

3. The method of claim 2, wherein the sending the first safety signal to the at least one vehicle system includes sending a warning signal including one of an auditory signal, a visual signal, and a haptic signal.

4. The method of claim 2, wherein the sending the signal to activate a safety device includes pre-charging a head support system.

5. The method of claim 1, wherein the sending the first response signal to the at least one vehicle system includes sending a signal to initiate at least one of; pre-charging the brakes, deploying a rear facing bumper to an extended collision position, and lowering a bumper or vehicle height.

6. The method of claim 1, further comprising determining a collision from with an object in a forward direction is likely to result from a rear collision.

7. The method of claim 1, further comprising sending a third signal to at least one vehicle system to prepare for a forward vehicle collision.

8. A method of controlling stability of a vehicle comprising:

monitoring vehicle information with an electronic control unit;

determining a rear collision from a second vehicle approaching from a rear direction is likely; and sending at least a first safety signal and a first response signal to at least one vehicle system from the electronic control unit prior to the rear collisions determining a probability of collision following the at least one vehicle system changing state;

determining a clearance distance which the vehicle may be moved forward without and not contact a preceding object; and sending a signal to the brake system to release the brakes such that the vehicle may roll forward the determined clearance distance and applying the brakes to stop the vehicle at the clearance distance when the probability of collisions is that the rear collision is still likely.

9. The method of claim 8, wherein the at least one vehicle system changes state based upon the first response signal to prepare the vehicle for the rear collision.

10. The method of claim 8, wherein sending the first safety signal includes sending at least one signal to activate a visual warning, an auditory warning, haptic warning, and a safety device for the vehicle.

11. The method of claim 10, wherein the sending the first safety signal to the at least one vehicle system includes sending a signal to initiate pre-charging a head support system.

12. The method of claim 9, wherein the sending the first response signal to the at least one vehicle system includes sending a signal to initiate at least one of; pre-charging the brakes, deploying a rear facing bumper to an extended collision position, and lowering a body height of the vehicle.

13. The method of claim 8, further comprising determining a collision from with an object in a forward direction is likely to result from a rear collision.

14. The method of claim 13, further comprising sending a third signal to at least one vehicle system to prepare for a forward vehicle collision.

\* \* \* \* \*